United States Patent
Ellis

[15] 3,657,783
[45] Apr. 25, 1972

[54] ESTABLISHMENT OF A SEAL BETWEEN CONCENTRIC SURFACES IN A HIGH TEMPERATURE ENVIRONMENT

[72] Inventor: Frank V. Ellis, Houston, Tex.

[73] Assignee: Cameron Iron Works, Inc., Houston, Tex.

[22] Filed: May 11, 1970

[21] Appl. No.: 48,716

Related U.S. Application Data

[62] Division of Ser. No. 778,283, Nov. 22, 1968, Pat. No. 3,575,198.

[52] U.S. Cl. ................................29/15.1 R, 277/1
[51] Int. Cl. ..............B21d 53/00, B21k 29/00, B23p 15/26
[58] Field of Search..............29/157.1, 421, 488, 434, 436; 277/1, 173, 177, 205; 285/113, 47; 137/171, 246, 246.15, 246.2, 246.22, 315; 251/172

[56] References Cited

UNITED STATES PATENTS

| | | | |
|---|---|---|---|
| 2,762,904 | 9/1956 | Thomas | 285/47 X |
| 2,914,345 | 11/1959 | Osborn | 285/113 X |
| 3,157,190 | 11/1964 | Allen | 251/315 X |
| 3,347,261 | 10/1967 | Yancey | 29/157.1 R X |
| 3,388,715 | 6/1968 | Ellis | 137/246.22 |

Primary Examiner—John F. Campbell
Assistant Examiner—Victor A. Di Palma
Attorney—Hyer, Eickenroht & Thompson

[57] ABSTRACT

A valve comprising a valve body having a central portion in which a ball is rotatably mounted, a tubular extension welded to each side of the central portion, and an annular seat mounted in the flowway through each tubular extension. In the assembly of the valve, the seat is mounted within the flowway during welding of the extension to the central portion of the body. There is a groove in the flowway about each valve seat, and a sealing ring is carried within each groove. The ring is of a material such as Teflon which, if confined against expansion while heated due to its proximity to the weld between the body portions, would reform into a different, non-sealing shape when cooled to ambient temperature. The base of the groove is deeper at one end than at the other and wider than the seal ring, so that said ring is relatively loosely received within the deeper end of the groove and relatively tightly engaged between the seat and the shallower end of the groove. The seal ring is arranged within the deeper end of the groove during welding and then moved into the shallower end thereof when the ring is cooled.

2 Claims, 5 Drawing Figures

PATENTED APR 25 1972 3,657,783
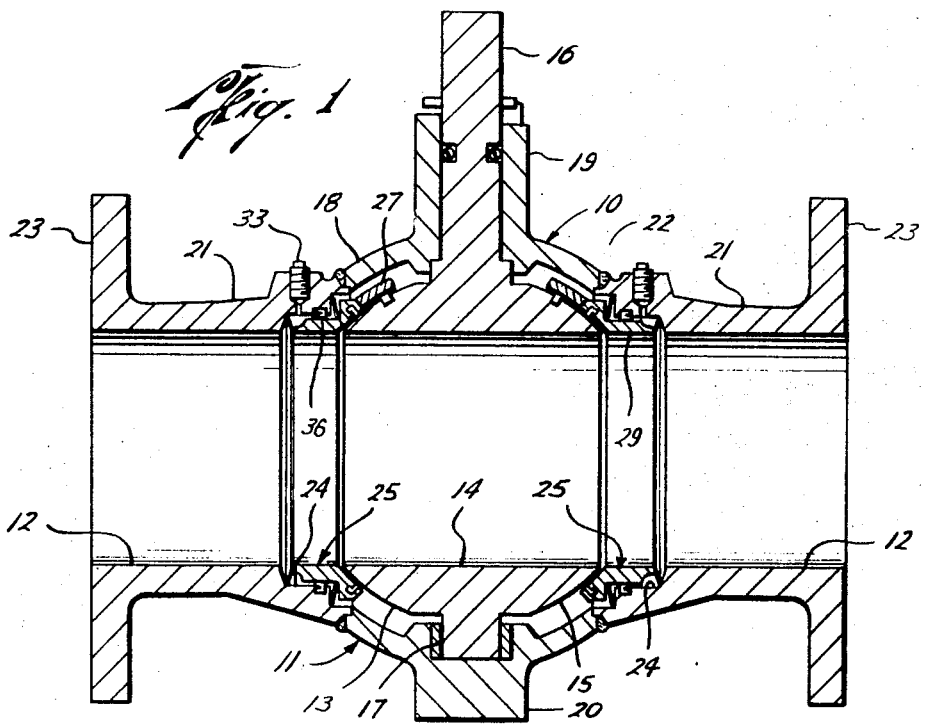
Fig. 1
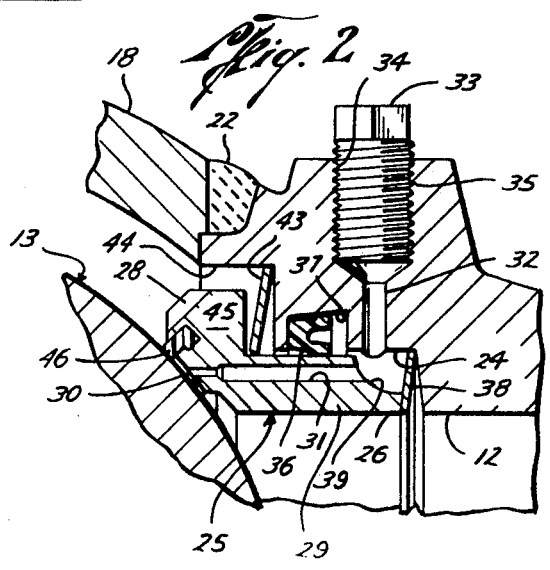
Fig. 2
Fig. 3A
Fig. 3B
Fig. 3C
Frank V. Ellis
INVENTOR.

ESTABLISHMENT OF A SEAL BETWEEN CONCENTRIC SURFACES IN A HIGH TEMPERATURE ENVIRONMENT

This is a division of application Ser. No. 778,283, filed Nov. 22, 1968, now U.S. Pat. No. 3,575,198, and entitled "Establishment of a Seal Between Concentric Surfaces in a High Temperature Environment."

This invention relates generally to improved apparatus in which a ring of deformable material is carried within a groove about one member for establishing a seal with such member and the oppositely facing surface of another member concentric thereto under high temperature conditions. It also relates to an improved method of establishing such a seal. In one of its aspects, this invention relates to a valve in which such a ring is carried in a groove for sealing with a valve seat and a flowway through the valve body in which the seat is mounted, and to a method for assembling such a valve, and particularly a method establishing the seal between the seat and flowway in a high temperature environment.

Polytetrafluoroethylene, which is supplied by E. I. duPont de Nemours & Co., Inc. under the trademark "Teflon," has many characteristics which make it well suited for use as a seal ring, especially when there is relative movement between the members to be sealed. Thus, this material, as well as similar materials such as "Kel-F" and "Nylon," are not only inert insofar as most fluids are concerned, but also have low coefficients of friction with metal. Consequently, such a material is frequently used in valves and other apparatus which may contain fluids detrimental to ordinary rubber seal rings, and especially as a seal ring between a seat mounted within the flowway of a valve body for relative movement with respect thereto.

However, such materials have coefficients of thermal expansion of the order of 10 times those of the metal from which the valve body or other apparatus is made. When a ring thereof is confined by such metal against expansion and then heated sufficiently high, the disparity in expansion rates causes a force to be exerted on the ring to reform it into a different shape on cooling, Thus, the ring may not seal or may provide only an unreliable, leaky seal when confined by a groove between concentric members in a conventional manner.

In the valve illustrated in U.S. Pat. No. 3,388,715, a seal ring is carried between each seat and the flowway through the valve body near portions of the body which are welded together during assembly of the valve and while the seats are mounted within the flowway. In this valve, each seat is not only movable axially of the seat, but also rotatable therein, so that a seal ring of Teflon or the like is especially advantageous. However, due to its proximity to the area of the welding and its confinement within a conventional groove in the flowway, such a ring would, upon cooling, reform into a different shape which would not provide a good seal.

An object of this invention is to provide apparatus including a ring of Teflon or like material for sealing between concentric surfaces in which the above noted problems are overcome, despite the assembly of such apparatus in an environment in which the ring is raised to a high temperature.

Another object is to provide such apparatus in which the sealing ring is arranged between a valve seat and the flowway through the body of a valve of the type above described.

These and other objects are accomplished, in accordance with the illustrated embodiment of the present invention, by apparatus in which the groove in one such concentric surface is wider than the seal ring and deeper at one end of the base of the groove than at the other end thereof. The ring is relatively loosely received in the deeper end of the groove and relatively tightly received between the base at the shallower end of the groove and the other concentric surface. During heating of the ring, it is arranged within the deeper end of the groove; and then, when the ring is cooled, it is caused to move into the shallower end of the groove to seal with the base of the groove and the other concentric surface.

In a valve of the construction above described, the groove is formed about the flowway and the seal ring is arranged within its deeper end during welding of the body parts. Then, upon completion of the welding and cooling of the ring, it is moved into the shallower end of the groove to seal with the seat and flowway.

In the drawings, wherein like reference characters are used throughout to designate like parts:

FIG. 1 is a longitudinal sectional view of a valve of the construction above described;

FIG. 2 is an enlarged sectional view of part of the valve of FIG. 1, but with the closure member moved to flowway closing position, and showing an illustrative embodiment of a seal arrangement constructed in accordance with the present invention for sealing with the flowway and a seat mounted within the flowway;

FIG. 3A is a further enlarged cross-sectional view of the seal ring of such seal arrangement removed from between the seat and flowway;

FIG. 3B is a detailed view of the seal ring of FIG. 3A, but upon disposal thereof between the deeper end of the groove in the flowway and the valve seat; and FIG. 3C is a view similar to FIG. 3B, but with the seal ring urged into tight sealing engagement with the shallower end of the groove and the valve seat.

With reference to the details of the above-described drawings, the valve shown in FIG. 1, and designated in its entirety by reference character 10, includes a metallic valve body 11 having a flowway 12 therethrough and a closure member 13 movable within the body for opening and closing the flowway. The closure member 13 includes an opening 14 through a ball 15 and upper and lower stems 16 and 17, respectively, to rotate it between flowway open and closing positions.

The valve body 11 includes a central portion 18 having bearings 19 and 20 on the upper and lower sides thereof, respectively, for receiving the ball stems 16 and 17. Stem 16 extends through the bearing 19 to provide an external part for actuating the closure member. The inner surface of this central body portion is shaped spherically and concentrically of the outer surface of ball 15 to provide a cavity fitting closely thereabout.

The valve body 11 also includes tubular extensions 21 connected by weldment 22 to the opening in each opposite end of central body portion 18. These tubular extensions have flanges 23 on their outer ends or connecting the valve in a pipeline and annular recesses 24 on their inner ends adjacent the closure member 13 to form enlarged diameter portions of the flowway 12 for receiving seats 25 adapted to seal against opposite sides of the closure member in the closed position thereof.

As described more fully in U.S. Pat. No. 3,157,190, the central portion 18 of the body 11 may be split along a plane passing through the axis of the flowway and perpendicular to the axis of rotation of the closure member, and the split parts then assembled over the stems 16 and 17 and welded to one another to capture the closing member. Seats 25 together with their associated parts, described below, are then assembled within the recesses 24 of each tubular extension 21, and the extensions and the seats moved into positions for forming the welds 22.

In its preferred form, the valve 10 also includes a means for rotating each seat 25 about its axis in response to operation of the valve so as to distribute ware about the seat. Thus, as shown in FIG. 1, a dog 27 is carried on each upper side of the ball 15 for engaging with and disengaging from teeth 28 about the periphery of the seat 25 as the closure member is rotated between opened and closed positions. A detailed explanation of the construction and operation of these parts can be found in the aforementioned U.S. Pat. No. 3,157,190. It will be understood that the problem toward which the present invention is directed is particularly important to this case, where the seat is mounted not only for reciprocation but also for rotation.

As best shown in FIG. 2, each seat 25 comprises an annular one-piece body 29 having a groove 30 in its inner end for disposal opposite the closure member 13. This groove is adapted to contain a viscous grease to provide a sealing film across the oppositely disposed surface of the closure member. For this purpose, the body 29 of the seat has passageways 31 therein connecting the groove with a passageway 32 in the valve body to which a fitting 33 is connected to permit lubricant to be injected through the passageways and into the groove at a desired pressure. Thus, the outer end of the valve body passageway 32 has threads 34 thereabout to receive threads 35 of the fitting, which may be of conventional construction.

A seal ring 36 of Teflon or like material surrounds the outer circumference of the seat body 29 and is carried within a groove 37 about the flowway recess 24 so as to seal between the flowway and the seat body on the inner side of lubricant passageway 32, as will be described below. A washer-type spring 38 engages the flowway on the outer side of the lubricant passageway 32 and the outer end of the seat body 29 near its inner circumference. Thus, this spring not only urges the inner end of the seat body against the closure member 13, but also cooperates with the seal ring 37 to enclose an annular lubricant chamber between the seat body and flowway with which the inner end of passageway 32 and outer ends of passageways 31 are connected. As described in U.S. Pat. No. 3,388,715, when the pressure of the lubricant within the lubricant chamber becomes excessive, the inner end of the spring 38 engageable with the outer end of the seat body 20 disengages therefrom to permit lubricant to pass out of the chamber between the seat body and the spring.

A washer-type spring 43 engages with flowway 12 adjacent a further enlarged portion 44 thereof and with an enlarged head 45 on the radially outward portion of the inner end of the seat. This spring forces the seat body inwardly against the closure member and serves to prevent debris from entering the space between the flowway and seat body.

Seat 25 also includes a seal ring 46 received with a groove about the seat body radially outwardly from groove 30. As shown in FIG. 2, the inner end of the ring 46 engages the outer surface of the closure member 13 to prevent lubricant from passing into the valve body downstream from the seat.

As shown in FIG. 3A, seal ring 36 is essentially "C"-shaped in cross section, with legs 36a which flare outwardly when relaxed and extend toward the pressure to be contained, i.e., lubricant or line pressure upstream of the ball 13. These legs have lips 36b on the outer sides of their ends. Obviously, however, the ring 36 may have other cross-sectional shapes, including "O" rings.

As best shown in FIGS. 3B and 3C, base 37a of groove 37 is conical and thus deeper at the end nearer the outer end of the seat than at the other end nearer the inner end of the seat. Also, the ring 36 is wider than the width of the seal ring 36. Thus, the ring shown in FIG. 2 may occupy a right hand or outer position, as in FIG. 3B, in which it is relatively loosely received within the deep end of the groove, and a left hand or inner position, as in FIG. 3C, in which it is relatively tightly engaged with the base 37a of the groove at its shallow end as well as the seat body 29 for sealing therebetween.

As previously described, ring 36 is arranged in the outer position (FIG. 3B) of groove 37 during welding of body portions 18 and 21. Thus, in the assembly of the valve, the seat 25 is mounted within the flowway and held against the ball 13 prior to making of the weld. For this purpose, the ring 36 is first placed within the groove 37, and the seat is inserted into the flowway, from left to right in FIG. 2, which movement urges the seal ring to its outer position.

Due to the proximity of ring 36 to weld 22, the ring may be heated to 700° F. or more at which it would, if confined, reform to a different, non-sealing shape upon cooling. However, since the ring is relatively loosely received in the deeper end of the groove, it is not reformed to a non-sealing shape on cooling. Preferably, the width of groove 37 and the taper of its conical base 37a are so proportioned that although the inner lip 36b of ring 36 is tightly engaged with seat body 29, the outer lip barely contacts the base of the groove when in the outer position as shown in FIG. 3B. Then, after movement to the inner position, the ring 36 engages the base of the groove as well as the seat with a sealing, interference fit, as shown in FIG. 3C. On completion of the welding, and after sufficient cooling, seal ring 36 may be moved from outer to inner position by pressure introduced through flowway 12 and passageway 31 or through passageway 32.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In a method of assembling a valve which includes an annular valve seat mounted within a flowway through the valve body for engaging one side of the closure member therein, and a seal ring of Teflon or like material for sealing between the flowway and valve seat, and wherein the valve body includes separate portions which are welded together at a location near said ring so as to raise said ring to a temperature at which such ring, if confined against expansion, will reform into a different shape upon cooling, the steps of providing a groove in the flowway and about the seat which is wider than the seal ring and which is deeper at one end than at the other so as to receive the seal ring relatively loosely at said one end and relatively tightly at said other end, arranging said ring in the one end of the groove as said body portions are so welded, and then, upon completion of the welding and cooling of said ring, moving said ring into said other end of the groove so as to cause it to seal between said seat and flowway.

2. In a method of establishing a seal between a first member concentrically received within an opening in a second member by means of a seal ring of Teflon or like material, and in an environment in which the ambient temperature is raised to a level at which such ring, if confined against expansion, will reform into a different shape upon cooling, the steps of providing a groove about one of said members and opposite the concentric surface of the other member which is wider than the seal ring and deeper at one end than at the other so as to be adapted to receive said ring relatively loosely at said one end and relatively tightly at said other end, arranging said ring within said one end of the groove as said temperature is so raised, and moving said ring into said other end of the groove when said ring has cooled so as to cause it to sealably engage with said members.

* * * * *